March 11, 1969

F. T. HOWELLS 3,432,049

APPARATUS FOR AUTOMATICALLY FEEDING
ARTICLES FROM A STORE OR BATCH

Filed Feb. 20, 1967

INVENTOR:
FRANCIS T. HOWELLS
BY
Imrie & Smiley
ATTYS.

INVENTOR:
FRANCIS T. HOWELLS

-FIG.11.-

United States Patent Office 3,432,049
Patented Mar. 11, 1969

3,432,049
APPARATUS FOR AUTOMATICALLY FEEDING ARTICLES FROM A STORE OR BATCH
Francis Thomas Howells, Moels, Hoylake, England, assignor to Elliotts Liverpool Limited, Liverpool, Lancashire, England, a British company
Filed Feb. 20, 1967, Ser. No. 617,200
U.S. Cl. 214—89                                    10 Claims
Int. Cl. B66b 17/14; B25j 3/00

ABSTRACT OF THE DISCLOSURE

An apparatus for automatically feeding articles from a store or batch of such articles to a testing or processing station has a rotatable table for supporting at least one ring of aricles for rotation with the table. The table is rotated step-by-step to bring each article in turn to a transfer station. A transporting mechanism is reciprocatable between said transfer station and a testing or processing station centrally located within the table. Openable and closable, article-holding, jaw means are provided on said transfer mechanism, means being provided for raising and lowering said jaw means. The apparatus also includes time sensitive switch means operative cyclically to step or index the table to bring an article to the transfer station, cause the jaw means to engage and raise said article, the transport means to transport the article to the testing or processing station, the jaw means to lower the article and release it into said testing or processing station and after the testing or processing operation has been carried out to cause the jaw means to engage and lift the article from the testing station, the transfer means to transport it back to the transfer station and the jaw means to lower and open so as to release the article to its position in the rotary table.

---

This invention is for improvements in or relating to apparatus for automatically feeding articles from a store or batch of such articles to a testing, processing or like station and subsequently returning the articles to the store or otherwise removing them from the testing or processing station.

One particular application of the invention, which is mentioned by way of example, is to apparatus for use in the testing, measuring or like investigation or processing of medical, biological and like samples or specimens. For example, the samples may be blood samples containing radioactive isotopes or tracer elements or samples of serum or other body fluids and the like upon which tests, radioactive counts or various treatments have to be performed.

For certain purposes, particularly in the fields of medicine, biology and the like, an apparatus is required for automatically feeding samples or specimens from a store of such samples or specimens to a testing station and, after the required tests or measurements have been made, returning the samples to the store or forwarding them to a further station. One object of the present invention is to provide an apparatus for that purpose which, although of particularly compact construction, is capable of handling a relatively large number of samples or other articles.

According to the present invention there is provided an apparatus for automatically feeding articles from a store or batch of such articles to a testing or processing station, wherein the store is rotatable or movable around the testing or processing station and transport means is provided for taking articles from the store, as they are brought to it by rotation of the store, and transporting them from the store to the testing or processing station.

The transport means is conveniently in the form of a carriage which moves or shuttles in a radial path between a halt and transfer station for the store and the testing or processing station.

In one preferred embodiment of the invention step-by-step rotation or indexing of the store is effected by a reciprocating wedge or wedges which engage pins, studs or the like spaced around the store which comprises a rotatable disc or table. Conveniently the wedge or wedges is or are shaped (e.g., provided with a parallel sided portion) so that they lock or hold the store against movement during halt or dwell periods during which an article is being fed from the store to the testing station, tested and, in some cases, returned to the store.

The transport means includes grippers or pairs of fingers which pick up articles from the store, hold them during their passage to the testing or processing station and then release them into said testing or processing station. Subsequently the grippers or fingers may again take up the article from the testing station for its return to the store, after which the store is indexed on for the next article to be fed to the testing station.

One particular embodiment of the invention will now be described, by way of example, as applied to an apparatus for automatically feeding blood samples containing radioactive isotopes from a store, comprising a large number of said samples, to a testing station and, after testing or measuring the radiation level of said samples, returning them to the store. In the following description reference is made to the accompanying drawings in which:

The apparatus comprises a box-like base 60 on the upper art of which there is rotatably mounted a circular disc or table 61. This table is supported for rotation on ball, roller or other antifriction bearings 62 spaced around its peripheral portion.

Step-by-step rotation or indexing of the table 61 is effected by a pair of opposed wedges 63 and 64 (see FIGURES 5 to 8) which alternately enter between pins or studs 65 spaced around the periphery of the table on the underside thereof. These pins or studs may have rotatable collars which are engaged by the wedges. The wedges are mounted for reciprocation, in a radial path with respect to the centre of the rotatable table, on a plate 66 which is driven from an electric motor 15 through a crank, scotch yoke or like mechanism 67, the driving motor being housed in the base of the apparatus. The wedges 63 and 64 have parallel sided portions 68 and 69 which, during halt or dwell periods of the table 61, fit between a pair of the pins or studs 65 and lock the table against rotation.

Let into the rotatable table adjacent its periphery are inner and outer circular concentric rows of holes or cups 70. Each row may comprise a relatively large number of cups, e.g., 50 or more. There may be more than two rows or circles of such cups in the store.

Figure 9:
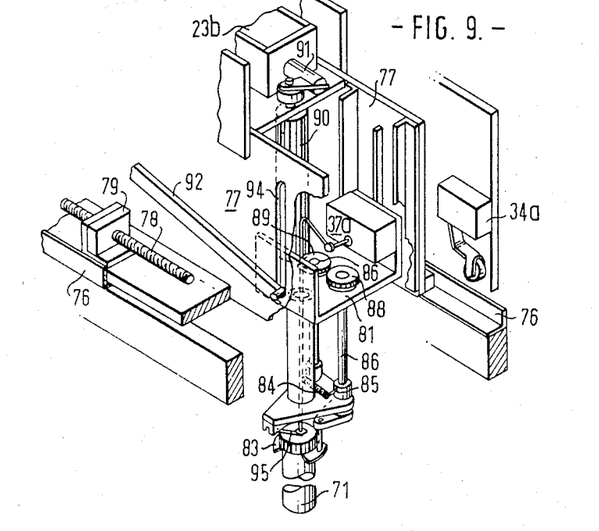
FIGURE 9 is a fragmentary detail view of a mechanism for transporting the samples between a store of such samples and a testing or counting station.

The cups are designed to hold the blood samples which are contained in stoppered small cylindrical bottles or test tubes 71 (see FIGURE 9).

In an aperture at the centre of the disc or table 61 there is provided a stationary testing or counting station 72, having a single cup to receive one of said bottles or test tubes and in the form of a lead-walled chamber. A lead cover or hatch 73 is provided for the chamber 72, movement of the hatch to open and close the chamber being effected by an electric motor 14 through a pinion 74 which meshes with a pivoted toothed sector 75 on which the hatch is mounted.

Figure 1:
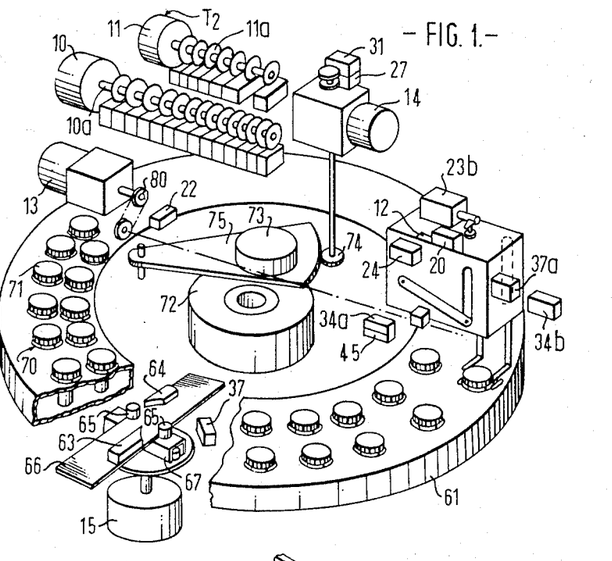
FIGURE 1 is a perspective diagrammatic representation of the apparatus.
Figure 2:
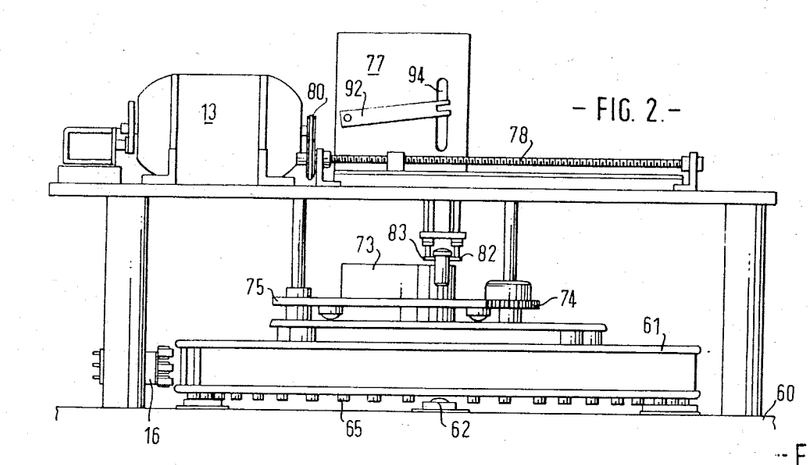
FIGURE 2 is a side elevation.
Figure 3:
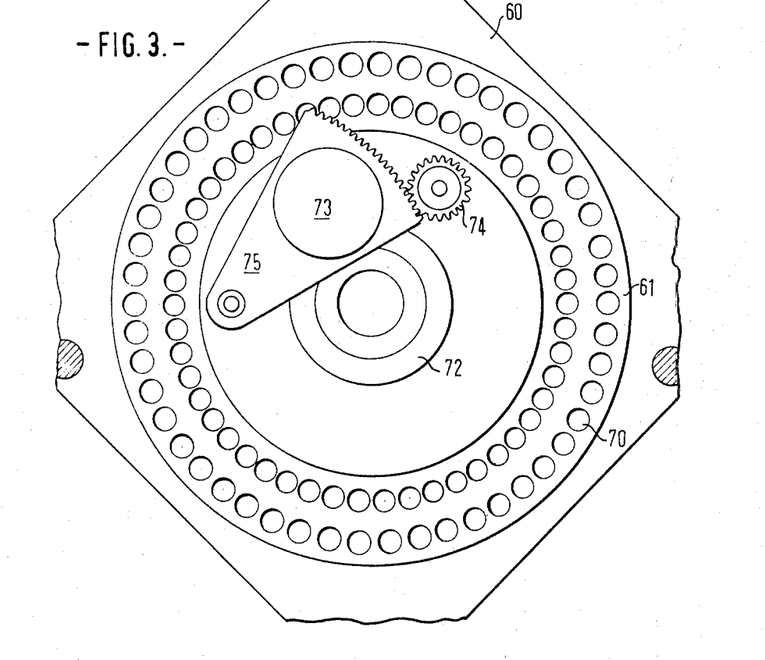
FIGURE 3 is a fragmentary plan view.
Figure 4:
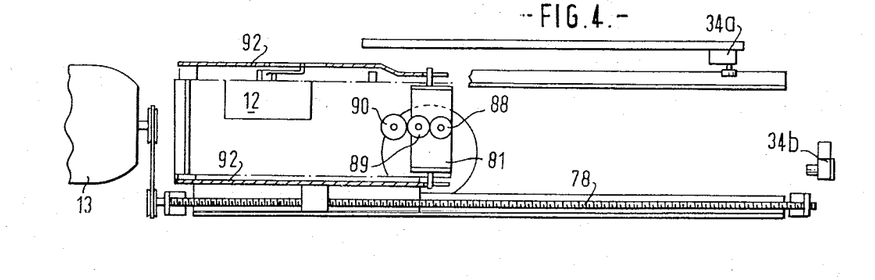
FIGURE 4 is a sectional plan view.
Figure 5:
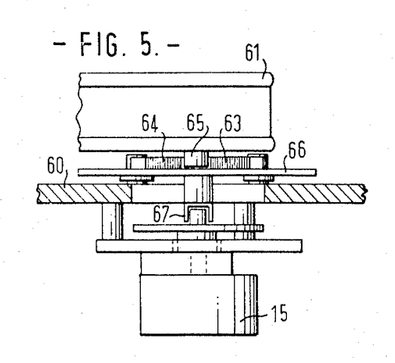
FIGURE 5 is a fragmentary detail view of the means for stepping round or indexing a rotary sample carrying table of the machine.
Figure 6:
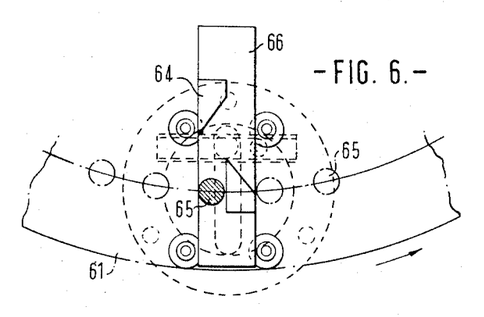
FIGURES 6, 7 and 8 are plan views of the mechanism shown in FIGURE 5 and illustrate the stages in indexing or stepping round the rotary table.
Figure 7:
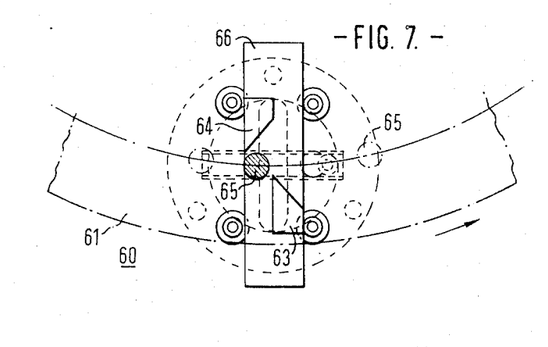
Figure 8:
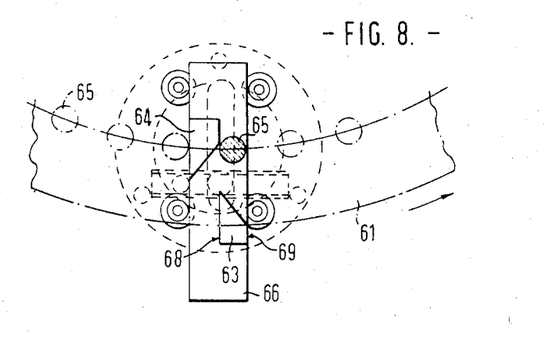
Figure 10:
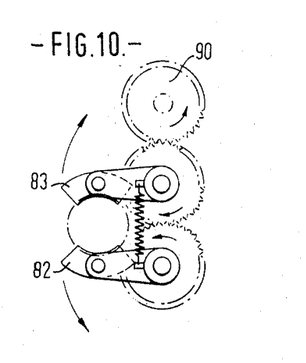
FIGURE 10 is a plan view of part of the mechanism shown in FIGURE 9.

The transport mechanism (see more particularly FIGURES 9 and 10) for transporting or shuttling the samples 71 between the store and the counting chamber 72 comprises rails 76 which span the rotary table 61 and slidably support a carriage 77. Movement of the carriage radially over the table 61 between the store and the counting chamber 72 is effected by a screw or worm 78 which engages a threaded nut 79 on the carriage and is driven by an electrical motor 13 through belt or other gearing 80 (see FIGURE 1). Slidably mounted in the carriage 77 for vertical movement is a secondary carriage 81 which shuttles between the store and the counting chamber with the carriage 77. The secondary carriage 81 carries grippers 82 and 83 for the samples 71. The grippers are urged into engagement with the sample by means of a spiral spring 84 connected between arms 85 on shafts 86. The latter have further arms 87 on their lower ends to which the grippers 82 and 83 are attached. At their upper ends the shafts 86 have secured to them meshing pinions 88 and 89, the pinion 89 meshing with a long pinion 90. The long pinion 90 is operatively connected to the plunger 91 of a solenoid 23b.

The arrangement just described is such that when the solenoid 23b is energised the pinion 90 rotates the pinions 88 and 89 so as to open the jaws 82 and 83 whereas when the solenoid 23b is de-energised said jaws, under the action of the spring 84, close about a sample 71.

Vertical movement of the secondary carriage 81, to raise and lower the grippers 82 and 83, is effected by means of levers 92 having a connection at 93 to the carriage 81 which connection work in vertical slots 94 in the carriage 77. The levers 92 are raised and lowered by means of a motor 12, mounted on the carriage 77, and a crank 12a. The length of the pinion 90 enables this vertical movement of the secondary carriage 81 to take place without the drive through the pinions 88, 89 and 90 becoming disengaged.

The dimensions of the apparatus are such that the counting chamber 72 is well spaced from the store. The purpose of the lead chamber 72 and its lead cover 73 is to prevent the testing apparatus or the sample, under test or measurement, being affected by extraneous radiation or by background radiation from the many other samples in the store even although the construction of the apparatus is such that the radiation pattern may remain constant due to the circular arrangement of the samples 71 in the store and the central arrangement of the testing station 72.

The testing or measuring apparatus located in the testing station may, for example, be a nucleonic type of instrument such as a scintillation counter.

Figure 11:
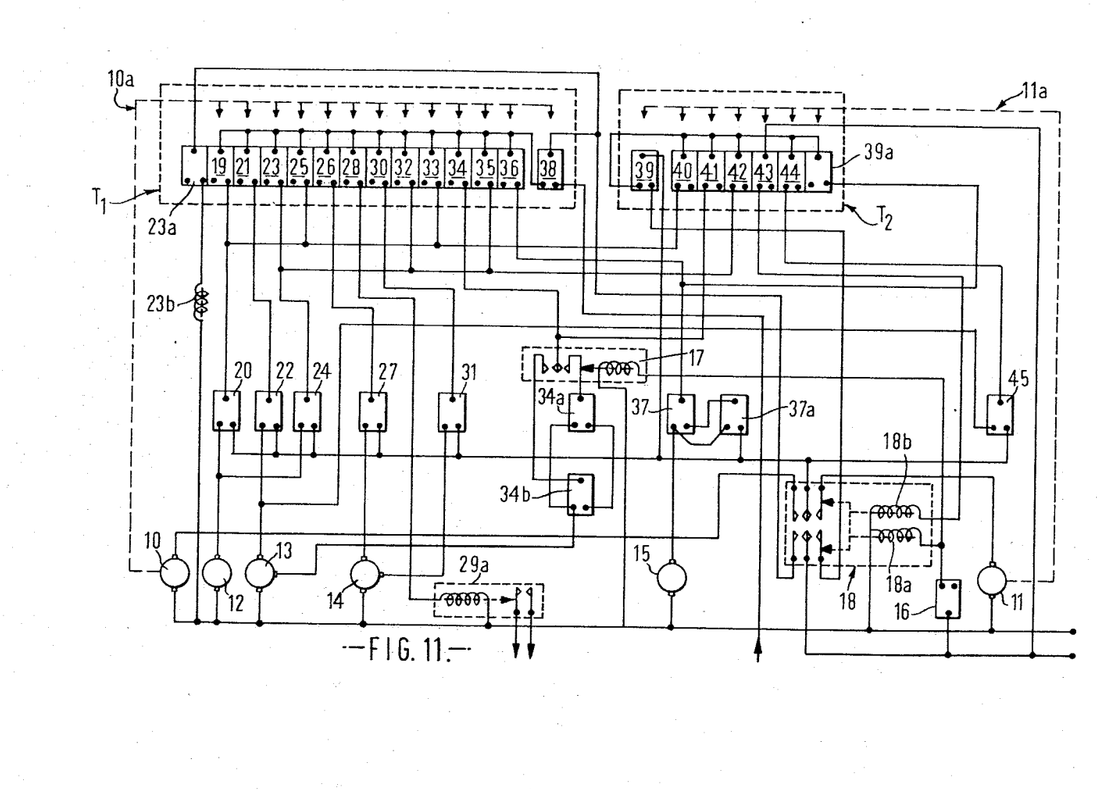
FIGURE 11 is a wiring diagram of electrical components of the apparatus.

Referring now to the electrical wiring diagram, FIGURE 11:

10 is an electric motor driving a camshaft 10a, of a timer T1, unidirectionally, 11 is an electric motor driving camshaft 11a, of a timer T2, unidirectionally.

12 is the unidirectional motor for operating the levers 92 to raise and lower the samples 71.

13 is the reversible electric motor for driving the lead-screw mechanism 78 for transporting the samples 71 between the annular store and the centrally located counting chamber 72.

14 is the reversible electric motor for opening and closing the hatch cover 73 of the counting chamber 72.

15 is the unidirectional electric motor for stepping round the table or platform 61 which carries the store of samples 71.

16 is a switch operated momentarily by a striker or the like fixed to the periphery of the rotatable platform or table 61.

17 is a relay under the control of switch 16 which, upon completion of the operations on the samples in the inner ring, disconnects a switch 34a from the circuit controlling radial movement of the sample transport mechanism to and from the store and connects into the said circuit the switch 34b. In a like manner, on completion of the operations on the samples in the outer store, the relay 17 disconnects switch 34b from the said circuit and reconnects the switch 34a therein.

18 is a mechanically latched/electrically released relay having an operating coil 18a and a release coil 18b. It is impulsed by switch 16 at the same time as relay 17 and controls the selection of either timer T1 or timer T2 in a manner to be described hereafter.

T1 is a timer comprising switches 19–21–23–23a–25–26–28–30–32–33–34–35–36 and a control switch 38 which regulates the operation of the motor 10 and thus the sequential movements of camshaft 10a which carries the cams for operating said switches. The function of this timer is to control the sequential delivery of a sample from the store to the centrally located counting chamber 72, closing of the hatch cover 73, initiation of the counting or other operation to be carried out on the sample, opening of the hatch cover 73, the return of the sample to its original position in the store and stepping round of the platform or table so as to present a fresh sample to the transport mechanism 77, 81, 82, 83, which sample may then be passed through the same sequence of operations. Timer T1 performs these sequential functions of all the samples in both the inner and outer rings. It should be noted that a complete sequence of operations performed by timer T1 is accomplished by one full revolution of camshaft 10a.

T2 is a timer comprising switches 39a–40–41–42–43–44 and a control switch 39 which regulates the operation of the motor 11 and thus the sequential movements of camshaft 11a. The function of this timer is to control the sequential movements of the sample transport mechanism 77, 81, 82, 83, when it is required to transpose this mechanism from operation on the inner ring of samples to operation on the outer ring of samples and likewise in a reverse order from the outer to the inner ring. In performing the function of controlling the sequential movements of the sample transport mechanism from the inner to the outer ring of samples, the camshaft 11a makes a half revolution and operates certain of the switches referred to above in a particular sequence. In a like manner, in transposing the sample transport mechanism from the outer to the inner ring of samples, the camshaft 11a makes a further half revolution and operates certain of the switches referred to above in a further and differing sequence to that performed during the first half revolution of the said camshaft.

19 is a switch actuated by a cam on camshaft 10a which, through switch 20, controls motor 12 to make one half revolution of crank 12a to raise a sample from the store (inner or outer ring as selected).

21 is a switch actuated by a cam on camshaft 10a which, through switch 22, controls motor 13 to traverse the sample transporting mechanism (and thus the sample) from the store (inner or outer ring as selected) to the counting chamber 72.

23 is a switch actuated by a cam on camshaft 10a which, through switch 24, controls the motor 12 to make a further half revolution of crank 12a so as to lower the sample into the chamber 72.

23a is a switch actuated by a cam on camshaft 10a which controls the action of solenoid 23b which, when energised, actuates the mechanism for opening the jaws 82, 83 of the sample transporting mechanism. It should be noted that switch 23a is operated three times during one complete revolution of camshaft 10a in a manner which will be described hereafter.

25 is a switch operated by a cam on camshaft 10a which, through switch 20, causes the jaws 82, 83 of the sample transport mechanism (opened at the same sequential position of the camshaft 10a by a cam actuating switch 23a in the manner just described) to be raised by the crank 12a making one half revolution, thus leaving the sample within the counting chamber.

26 is a switch actuated by a cam on camshaft 10a which, through switch 27, controls the motor 14 to move the cover 73 over the counting chamber 72.

28 is a switch operated by a cam on camshaft 10a which operates a relay 29a which causes a D.C. signal or the like to pass to the electronic control of the counting mechanism in the chamber 72, thus starting the counting operation.

30 is a switch operated by a cam on camshaft 10a which, through a switch 31, controls the motor 14 to move the cover 73 to open the counting chamber.

32 is a switch operated by a cam on camshaft 10a which, through a switch 24, controls the motor 12 to make one half revolution of the crank 12a to lower the jaws 82, 83 of the sample transport mechanism (opened at the same sequential position of camshaft 10a by a cam actuating switch 23a as previously described) over the sample located in the chamber 72.

33 is a switch operated by a cam on camshaft 10a which, through switch 20, controls motor 12 to make one half revolution of crank 12a to raise the sample from the counting chamber, the jaws 82, 83 of the sample transport mechanism being closed by the interruption of the current flow to the solenoid 23b caused by the opening of switch 23a due to the sequential movement of camshaft 10a.

34 is a switch operated by a cam on camshaft 10a which, through a switch 34a or switch 34b, controls the motor 13 to traverse the sample transport mechanism, and thus the sample, back from the counting chamber 72 to the store circular. If the inner store is in use, then the switch 34a will be selected. If the outer store is in use, then switch 34b will be selected. Selection of the said switches 34a or 34b is controlled by the action of the striker or the like fixed to the periphery of the platform or table 61, so as to actuate the switch 16, and impulsing relay 17 as described heretofore.

35 is a switch operated by a cam on camshaft 10a which, through a switch 24, controls the motor 12 to make one half revolution of crank 12a to lower the sample to its original location in the store from which it had been removed for counting operations or the like to be performed upon it.

36 is a switch operated by a cam on camshaft 10a which, through a switch 37, controls the motor 15 to step the platform or table 61 round by means of the wedge mechanism 63, 64 heretofore described, the jaws 82, 83 of the transport mechanism having been opened at the same sequential position of camshaft 10a by a cam acting on switch 23a as previously described.

38 is a switch, which, by controlling the rotational movement of the motor 10 also controls the sequential movement of the camshaft 10a and thus the sequential operation of the switches 19–21–23–23a–25–26–28–30–32–33–34–35 and 36, the whole comprising the timer T1. Additionally, switch 38 is itself operated by a cam on camshaft 10a so that the sequential movement of camshaft 10a is of a stepwise nature, each of the switches in turn being operated once for one complete revolution of camshaft 10a except for switch 23a which is operated three times at the same sequential point as certain other switches as described heretofore.

39 is a switch which, by controlling the action of motor 11, also controls the sequential movement of the camshaft 11a and thus the sequential operation of the switches 39a–40–41–42–43–44, the whole comprising the timer T2. Additionally, switch 38 is itself operated by a cam on camshaft 11a so that the sequential movement of said camshaft is of a stepwise nature, so that certain of the said switches are operated sequentially during the first half revolution of the camshaft 11a and certain of the said switches are operated during the further half revolution of the camshaft 11a as heretofore described.

39a is a switch operated by a cam on camshaft 11a which, through a switch 37a controls the motor 15 to step the platform or table 61 round in the manner heretofore described.

40 is a switch operated by a cam on camshaft 11a which, through a switch 20, controls the motor 12 so as to make one half revolution of crank 12a to raise the jaws 82, 83 of the sample transport mechanism, the jaws having been previously opened by the action of a cam on camshaft 10a of timer T1. Switch 23a, supplying current to the solenoid 23b, remains closed throughout the period that timer T2 is in operation as it is not possible for camshaft 10a, of timer T1, to make any further sequential movements due to the removal of the power supply from circuitry of timer T1.

41 is a switch operated by a cam on camshaft 11a which, through a switch 34b, controls the motor 13 to traverse the sample transport mechanism to a position over the outer ring of samples. This switch is only operated by camshaft 11a during the first half revolution of the said camshaft and when the sample transport mechanism is moved from the inner to the outer ring of samples.

42 is a switch operated by a cam on camshaft 11a which, through a switch 24, controls the motor 12 so as to cause the crank 12a to make one half revolution so as to lower the jaws 82, 83 of the sample transport mechanism over a sample. In this example of the invention the jaws will be positioned over the fifty-first sample.

43 is a switch operated by a cam on camshaft 11a which allows current to flow to the release coil 18b of relay 18. The effect of this is to restore the changeover contacts of relay 18 to their normal position, thus switching off timer T2 and switching on timer T1.

44 is a switch operated by a cam on camshaft 11a which, through a switch 45, controls the motor 13 to traverse the sample transport mechanism to a position over the inner ring of samples. This switch is only operated by camshaft 11a during the second half revolution of the said camshaft and when the sample transport mechanism is moved from the outer to the inner ring of samples.

Switch means, operated by a movable part of the apparatus, may be provided to ensure that the timer motors, or one of them, will commence to run when required irrespective of the position in which the motor control cams may have come to a halt.

The apparatus described above operates as follows:

When the apparatus is switched on current is made available over the line L to the timer motor 10 of timer T1. Rotational movement of this motor causes a cam on camshaft 10a to close switch 38 which then takes over the task of supplying current to motor 10 from the original source of supply. Motor 10 continues to run until switch 38 is opened by the further action of the said cam causing an interruption in the supply current. At the same point at which switch 38 is opened a cam, on camshaft 10a, closes switch 19 allowing current to travel via switch 20 to motor 12 which, being energised, raises a sample from the store. It should be noted that in this example of the invention, the sample is removed from the inner ring of samples but it could equally be from the outer ring of samples.

Upon completion of the movement of raising the sample from the store the switch 20 is operated. This switches the current supply from the motor 12 to the timer motor 10. On being energised, motor 10 rotates camshaft 10a and closes switch 38 which then takes over the supply of current to the timer motor 10 as the original source of supply has been interrupted by the opening of switch 19 due to the rotational movement of the camshaft 10a. Timer motor 10 continues to run until the cam associated with switch 38 causes that switch to open, thus interrupting the current supply to the motor 10. At the same time a cam on camshaft 10a closes switch 21 and allows current to travel via switch 22 to motor 13 which, being energised, traverses the sample transporting mechanism (and thus the sample) to a position over the centrally located counting chamber 72.

Upon completion of this traversing movement of the sample, switch 22 is operated and switches the supply current from the motor 13 to the timer motor 10. The stepwise movement of the camshaft 10a is then completed in the manner hereinbefore described so that switch 23 is closed by a further cam on camshaft 10a, allowing current to travel via switch 24 to motor 12 which causes the sample to be lowered into the counting chamber.

Upon completion of the lowering movement the switch 24 initiates a further stepwise movement of the camshaft 10a upon completion of which switch 25 closes allowing current to flow, via switch 20, to the motor 12. At the same instant that switch 25 is closed, a further cam on camshaft 10a closes switch 23a which allows current to flow to the coil of solenoid 23b which opens the jaws 82, 83 of the sample transport mechanism. The jaws are then raised by the motor 12, the sample being left in the counting chamber.

Upon completion of the raising movement of the jaws, switch 20 is operated initiating a further stepwise movement of camshaft 10a which, upon completion, closes switch 26. This allows current to flow, via switch 27, to the motor 14 which upon being energized, closes the cover 73 over the counting chamber 72, thus ensuring that the sample is completely surrounded by a lead shield on all sides.

Upon completion of the cover closing movement switch 27 is operated initiating a further stepwise movement of camshaft 10a which, upon completion, closes switch 28, allowing current to flow to the coil of relay 29 which operates a pair of contacts to send a D.C. signal to the external electronic counting mechanism.

Upon completion of the counting or other operation upon the sample, the external counting mechanism or other device sends an impulse to the timer motor 10. This impulse initiates a further stepwise movement of camshaft 10a, upon completion of which switch 30 is closed allowing current to flow, via switch 31, to the motor 14 which, upon being energized, opens the cover 73 to expose the sample in the counting chamber.

Upon completion of the opening of the cover, switch 31 is operated initiating a further stepwise movement of camshaft 10a upon completion of which, switch 32 is closed allowing current to flow, via switch 24, to motor 12.

At the same time as switch 32 is closed, a further cam on camshaft 10a closes switch 23a and allows current to pass to the coil of solenoid 23b, thus opening the jaws 82, 83 of the sample transport mechanism which are then lowered by motor 12 over the sample in the counting chamber.

Upon completion of the lowering movement, switch 24 initiates a further stepwise movement of camshaft 10a which upon completion closes switch 33 allowing current to travel, via switch 20, to motor 12. A consequence of the stepwise movement of camshaft 10a, to close switch 33, is that the switch 23a is opened, thus interrupting the flow of current to the coil of solenoid 23b. This causes the jaws to close and the motor 12 raises the sample from the counting chamber.

Upon completion of the sample raising movement, switch 20 is operated initiating a further stepwise movement of camshaft 10a on completion of which switch 34 is closed allowing current to travel via either switch 34a or switch 34b to motor 13. The conditions under which either switch 34a or switch 34b is used have previously been described. For the purpose of the present explanation it will be assumed that switch 34a is in use and that upon being energized the motor 13 traverses the sample transport mechanism, back to a point over the inner ring of samples.

Upon completion of this traversing movement, switch 34a is operated initiating a further stepwise movement of the camshaft 10a upon completion of which the switch 35 is closed allowing current to flow, via switch 24, to the motor 12 which, upon being energized, lowers the sample to its original position in the store from which it had previously been removed.

Upon completion of this lowering movement switch 24 is operated initiating a further stepwise movement of the camshaft 10a which, upon completion, closes switch 36 allowing current to flow, via switch 37, to the motor 15. At the same time as switch 36 is closed a further cam on camshaft 10a closes switch 23a allowing current to flow to the coil of solenoid 23b to open the jaws of the sample transport mechanism. Motor 15, upon being energized, steps the platform or table round by means of the wedge mechanism hereinbefore described, the jaws of the sample transport mechanism remaining open.

It is a feature of the invention that, should one or more of the cups or holes 70 be empty, the stepwise movement of the table 61 will continue indefinitely until a further sample 71 located in the said table is presented between the jaws of the sample transport mechanism. For that purpose a switch 37a, hereinafter referred to as the "detector switch" is linked mechanically with a sample detecting device 95 as shown in FIGURE 9. When no sample is present between the jaws 82 and 83 of the transport mechanism, the detecting device 95 is allowed to fall slightly under the action of a spring. This causes the detector switch 37a to close in a particular direction so that current, which normally flows from the switch 36 via the switch 37 to the motor 15, is directed directly to the motor 15, whatever the position of the switch 37, thus allowing the motor 15 to run continuously. When, however, a sample is present between the jaws of the sample transport mechanism, the detecting device 95 is raised by the sample and closes the switch 37a in another direction. Closure of the switch 37a in this direction initiates a further stepwise movement of the camshaft 10a upon completion of which the switch 19 is closed allowing current to flow via switch 20 to motor 12. A consequence of the stepwise movement of the camshaft 10a, to close the switch 19, is that switch 23a is opened, thus interrupting the flow of current to the coil of solenoid 23b. Removal of the supply current causes the jaws 82, 83 to close so that the motor 12 raises the sample from the store. Thus, the cycle of movements is repeated until all the operations have been carried out on all the samples in, say, the inner ring.

Upon completion of all the operations on all the samples within the inner ring it is necessary to transpose the sample transport mechanism to the outer ring so that operations may be carried out on the further samples in that ring.

This transposition is carried out in the following manner:

For the purpose of this explanation it is assumed that there are 50 samples in the inner ring (numbered 1 to 50, inclusive) and 50 samples in the outer ring (numbered 51 to 100, inclusive). Thus, on completion of the operations on sample 50 (inner ring) it is necessary to transpose the sample transport mechanism so that it will be in a position to transport sample 51 (outer ring) to the centrally located counting chamber 72.

Consider timer T1 to be in operation and having completed operations on sample 50, returned that sample to its original location in the table 61. Upon completion of the lowering operation of sample 50 switch 24 is operated initiating a further stepwise movement of camshaft 10a, upon completion of which switch 36 is closed allowing current to flow, via switch 37 to the motor 15. At the same time as switch 36 is closed, a further cam, on camshaft 10a, closes switch 23a allowing current to flow to the coil of solenoid 23b to open the jaws of the sample transport mechanism. Thus, motor 15 upon being energised steps the table 61 round by the means hereinbefore described. When half of the stepping movement has been completed, the striker or the like, fixed to the periphery of the table, momentarily actuates the switch 16. The momentary operation of switch 16 allows a current impulse to travel to the coil 18a of relay 18 thus causing the changeover contacts to change position. The change of contact position is such that the current supply to these switches, forming the control system of timer T1, is transferred to the switches forming the control system of timer T2. Additionally, motor 10, of timer T1, is disconnected from that part of the circuitry which initiates stepwise movements of the camshaft 11a and motor 11 of timer T2 is connected to said circuitry.

A further consequence of the momentary closing of switch 16 is to allow a current impulse to travel to the coil of relay 17 causing the changeover contacts to change position so that switch 34a is disconnected from the control circuitry and switch 34b is connected to the circuitry. The change from switch 34a to switch 34b is necessary because the sample transport mechanism will be required to travel a greater distance when transporting samples to and from the outer ring of samples.

Immediately the power supply is transferred from timer T1 to timer T2 current flows through switch 39 to timer motor 11 causing a stepwise rotation of camshaft 11a on completion of which switch 39a is closed for current to flow, via switch 37, to the motor 15 allowing that motor to complete the stepwise movement of the table momentarily halted by the switching of relay 18. Thus, the rotary stepwise motion of the table 61, during the transposition sequence, is controlled partly by timer T1 and partly by timer T2. Upon completion of the stepwise movement of the table the jaws of the sample transport mechanism are located over sample No. 1, the jaws remaining open throughout the tranposition sequence as described heretofore.

Upon completion of the stepwise movement of the table, switch 37 is operated initiating, through switch 39, a stepwise movement of camshaft 11a upon completion of which switch 40 is closed allowing current to flow via switch 20 to motor 12, thus raising the jaws of the sample transport mechanism which have been opened by the action of a cam on camshaft 10a, timer T1 closing switch 23a and allowing current to flow to the coil of solenoid 23b. As there is no further movement of the camshaft 10a of timer T1 during the period that timer T2 is in operation, and as switch 23a receives its power supply direct from the mains supply, the flow of current to the solenoid is maintained and the jaws 82, 83 remain open throughout the period that the timer T2 is in operation.

Upon completion of the raising of the jaws, switch 20 is operated initiating a further stepwise movement of camshaft 11a, upon completion of which switch 41 is closed allowing current to flow, via switch 34b, to the motor 13. The motor 13 then traverses the sample transport mechanism to a point over the outer ring of samples. On completion of this traversing movement, switch 34a is operated initiating a further stepwise movement of camshaft 11a on completion of which switch 42 is closed allowing current to flow, via switch 24, to motor 12, thus lowering the jaws to a position over sample No. 51 located in the outer ring of samples radially opposite to sample No. 1.

Upon completion of this downward movement the switch 24 is operated initiating a stepwise movement of camshaft 11a, on completion of which switch 43 is operated allowing current to flow to the release coil 18b of relay 18.

The energising of the release coil 18b of relay 18 causes the changeover contacts of that relay to return to their normal position, thus reversing the effect described heretofore when operating coil 18a is impulsed. Thus, timer T1 and its associated switches and motor 10 are brought back into operation, timer T2 and its associated switches and motor 11 are disconnected from the various circuits and the samples 71 from the outer ring are transported to and from the counting chamber 72 in a like manner to that described with reference to the samples in the inner ring.

Upon completion of the operations on samples 51–100, inclusive, the transpositioning of the sample transport mechanism from the outer ring of samples to the inner ring is carried out in a like manner to that described above, for the transposition from inner to outer rings, except that the traversing of the sample transport mechanism after the raising of the jaws has to be carried out in the reverse manner and the relay 17 is impulsed so that the traversing movement of the sample transport mechanism, which must now move through a shorter distance, is correctly controlled.

The action of transposing the sample mechanism from the outer to the inner ring will now be briefly described:

The action of switch 16, the relay 18 and the impulsing of relay 17 are as described heretofore. Likewise, the jaws 82, 83 are raised to the upper position but on this occasion, on completion of this movement, switch 20 is operated and initiates a stepwise movement of camshaft 11a of timer T2 so that, on completion of this movement, switch 44 is closed allowing current to flow, via switch 45, to the motor 13 which traverses the sample transport mechanism to a point over the inner ring of samples. Upon completion of this movement, switch 45 is operated initiating a stepwise movement of camshaft 11a and the subsequent lowering of the jaws over sample 1 and the changeover to timer T1 as heretofore described.

Thus, the control mechanisms are such that the machine could, if so desired, be allowed to run continuously alternately carrying out operations on the inner ring of samples, then transferring operations to the outer ring of samples and so on alternately.

I claim:

1. An apparatus for automatically feeding articles from a store of such articles to a processing station comprising a rotatable table, means on said table for supporting at least one ring of articles for rotation with the table, means for rotating the table step-by-step to bring each article in turn to a transfer station, a transport mechanism reciprocatable between said transfer station and a processing station centrally located within the table, article holding means mounted on said transport mechanism for movement therewith between said transfer station and said processing station, means for raising and lowering said article holding means, means for causing the article holding means to take hold of or release an article and time-controlled switch and motor means operative cyclically to step the table to bring an article to the transfer station, cause the article holding means to take hold of and raise said article, cause the transport mechanism to transport the article to the testing or processing station, cause the article holding means to lower the article and release it into said processing station and, after the processing operation has been carried out, cause the article holding means to take hold of and lift the article from the processing station, cause the transport mechanism to transport it back to the transfer station and the article holding means to lower and release the article back into its position in the rotatable table.

2. Apparatus as claimed in claim 1 wherein the transport mechanism is reciprocated between the transfer station and the processing station by a screw and nut mechanism.

3. Apparatus as claimed in claim 1 wherein the transport mechanism comprises a carriage mounted for reciprocation between the transfer station and the processing station and supporting, for up-and-down movement on it, a secondary carriage which carries the article holding means, means, including a time-controlled motor, being provided on the carriage for raising and lowering said secondary carriage.

4. Apparatus as claimed in claim 1 wherein the processing station is in the form of an enclosure or chamber for the article and a cover is provided for said enclosure or chamber, time-operated motor means being provided for moving said cover to open the chamber to receive an article, subsequently move the cover to close the chamber and then move the cover to open the chamber for the removal of the article.

5. Apparatus as claimed in claim 1 wherein the time controlled switches are actuated and controlled by cams on a camshaft forming a part of an electrically-operated timer.

6. Apparatus as claimed in claim 1 wherein provision is made in the rotatable table for at least two concentric rings of articles, means being provided for altering the length of the path of travel of the transport mechanism between the transfer station and the processing station according to whether articles are to be moved between the outer ring of such articles and the processing station or the inner ring of such articles and the processing station.

7. Apparatus as claimed in claim 6 wherein switch means actuated by a part on the rotatable table initiates an automatic alteration in the length of the path of travel of the transport mechanism.

8. Apparatus as claimed in claim 1 wherein the article holding means comprises openable and closable jaws operated by meshing gear-wheels, one of said gear-wheels being operated by solenoid means and having substantial length so that the gear train remains operative despite the raising and lowering of the article holding means.

9. Apparatus as claimed in claim 6 wherein movement of the transport mechanism is controlled partially by one or other of two switches according to wether articles are being transported from the inner ring or the outer ring, said switches being selected by means responsive to the position of the rotatable table so that said selection is effected automatically after processing of one ring of articles has been completed.

10. Apparatus as claimed in claim 1 wherein step-by-step rotation of the rotatable member is effected by a reciprocating wedge means which engages pins spaced around the rotatable table, said wedge means having a parallel-sided portion so that it locks the rotatable table against movement during dwell periods when an article is being transported between the transfer station and the processing station and processed.

References Cited

UNITED STATES PATENTS

| | | | |
|---|---|---|---|
| 1,575,185 | 3/1926 | Stenhouse | 214—1 |
| 2,486,085 | 10/1949 | Whitmore et al. | 214—1 X |
| 2,696,921 | 12/1954 | Desjardins | 214—16.1 |
| 2,934,218 | 4/1960 | Peras | 214—1 |
| 3,163,756 | 12/1964 | Meeder et al. | 214—89 |

ALBERT J. MAKAY, *Primary Examiner.*

U.S. Cl. X.R.

74—818; 198—25; 214—1